United States Patent [19]
Dias

[11] 4,216,261
[45] Aug. 5, 1980

[54] SEMI-DURABLE, WATER REPELLANT, FIRE RESISTANT INTUMESCENT PROCESS

[75] Inventor: Gil M. Dias, Fall River, Mass.

[73] Assignee: The United States of America as represented by the Secretary of the Army, Washington, D.C.

[21] Appl. No.: 966,846

[22] Filed: Dec. 6, 1978

[51] Int. Cl.² .................. C09D 5/18; C09K 3/18
[52] U.S. Cl. .................................. 428/264; 106/2; 106/18.13; 106/18.16; 106/18.21; 106/18.24; 106/18.25; 106/18.27; 252/8.1; 428/290; 428/921
[58] Field of Search ............... 106/18.16, 18.21, 18.24, 106/18.25, 2, 18.13, 18.27; 260/DIG. 24; 427/390 D; 428/264, 290, 921; 252/8.1

[56] References Cited

U.S. PATENT DOCUMENTS

| | | |
|---|---|---|
| 3,372,131 | 3/1968 | Rohlfs et al. .................. 428/921 |
| 3,681,273 | 8/1972 | Kelly ............................ 260/2.5 AJ |
| 3,969,291 | 7/1976 | Fukuba et al. ................ 260/17.3 |

FOREIGN PATENT DOCUMENTS 1171491  11/1969  United Kingdom .

*Primary Examiner*—Lorenzo B. Hayes
*Attorney, Agent, or Firm*—Nathan Edelberg; Robert P. Gibson; Lawrence E. Labadini

[57] ABSTRACT

A process for imparting an intumescent, water repellent, fire retardant finish to fabrics comprising applying to the fabric an aqueous dispersion and drying same.

8 Claims, No Drawings

SEMI-DURABLE, WATER REPELLANT, FIRE RESISTANT INTUMESCENT PROCESS

STATEMENT

The invention described herein may be manufactured, used and licensed by or for the Government for governmental purposes without the payment of any royalty thereon.

FIELD OF THE INVENTION

This invention relates to coating compositions having semi-durable fire resistant and intumescent properties, and more particularly, to such compositions which can be applied to fabric materials.

BACKGROUND OF THE INVENTION

Several approaches have been applied in the past to efforts to develop practical fire-retardant paints. Generally, these approaches have involved the incorporation of chemicals in the paint, to function in varying ways to protect the substrate, e.g., materials have been used which evolve non-flammable gases to blanket the surface, excluding oxygen from the fuel; highly hydrated materials have been used, which evolve water vapor to cool the substrate; vitreous materials, which envelop the substrate in a non-combustible glass; and, materials which intumesce, forming a non-flammable insulative foam which directs the heat away from the substrate. These approaches provide only temporary protection for the substrate, but the ignition and comsumption of the substrate will be substantially slowed, so that time is allowed for the removal of persons and goods and for fire-fighting equipment to be summoned. This delay in spread-of-the-fire will therefore reduce the overall damage which will occur in a given period of time. Intumescent coatings are generally thought to offer protection for a longer period of time than do any of the other approaches.

An intumescent coating is one that has ingredients that react, upon heating, to form large amounts of an incombustible or substantially incombustible residue, that is expanded to a cellular foam having good thermal insulating properties. Generally such coatings have been developed and used as paints for application to solid surfaces such as wood surfaces. Upon exposure to high temperature or to a flame, the paint forms a heat-insulating layer on the coated surface, to protect it from heat. The principle has also been applied to the formulation of electrical insulation for coating electrical conductors, and to films.

Ideally the heat insulating layer should prevent or retard energy transfer, so that the coated substrate does not become sufficiently hot to deteriorate, i.e., reach its kindling point, melt, or the like.

In intumescent paints as often formulated in the past, there have been three basic types of ingredients used to produce the foam layer:

1. a source of carbon (the carbonific);
2. a phosphorus-releasing material (the catalyst); and
3. a source of non-flammable gases (the blowing agent).

As the intumescent paint is subjected to increased temperatures the catalyst decomposes, yielding phosphoric acid. Often, ammonium orthophosphate has been used as the catalyst, although the utility of an amine catalyst and amide phosphate reaction products such as melamine phosphate and polyphosphorylamide has also been described in the patent literature, see for example U.S. Pat. No. 3,969,291. To be effective, a catalyst must contain a high phosphorus content and decompose to yield phosphoric acid.

Upon release of the phosphoric acid from the catalyst and at an elevated temperature, reaction or association occurs with the carbonific. The carbonific is generally chosen from the carbohydrates, proteins or polyfunctional alcohols; e.g., starch, casein or pentaerythritol. To be effective the carbonific must contain a large number of "phosphorus-esterifiable" sites, a large percentage of carbon, and must decompose at a higher temperature than the catalyst.

Following reaction between the phosphoric acid and the carbonific, the resultant "ester" begins to decompose, producing a large volume of carbon, additional water, carbon monoxide, and non-flammable gases, and releasing the acid for further esterification. In general, the ester begins to decompose at a temperature significantly lower than the initial "non-esterified" carbonific.

Simultaneously with decomposition of the ester, the blowing agents begin to decompose, yielding large volumes of non-flammable gases. These gases cause the carbonaceous residue from the "ester" to bubble and foam, to form a thick insulative mat. Often two blowing agents, with slightly differing decomposition temperatures, are used, in order to extend the length of gas release. This results in greater foam heights. One blowing agent is usually chosen from the amides or amines, e.g., dicyanidiamide, urea, melamine or guanidine, while the other, lower temperature blowing agent is normally a chlorinated paraffin such as Chlorowax 70. "Chlorowax 70" is the registered trademark of Diamond Shamrock for a resinous chlorinated hydrocarbon product having the formula $C_{24}H_{28}Cl_{22}$, a chlorine content of 70% by weight, a flash point, closed cup, of none under 400° F., and a specific grafity of 1.66 at 25° C.

There is considerable overlapping of the reagent functions. For example, the catalyst releases gaseous materials such as ammonia, which may assist in blowing, although gaseous release from this source is nearing completion before the bulk of the carbon is formed. In another case, the blowing agents provide some additional carbon residue. However, these side benefits contribute only slightly, it is believed, to the end result.

In addition to the reactants discussed above, some formulations utilize a resinous material; such as, for example, a urea-or melamine-formaldehyde resin. This material melts to form a film or "skin" over the forming foam. This "skin" retains the gaseous materials within the foam, and tends to produce more continuous and uniform level of intumescence. When thermoplastic resinous binders are used, they generally assist in this function.

In summary then, the mechanism of intumescence consists of several steps, which may occur in this general order:

1. the catalyst decomposes to form phosphoric acid;
2. the resultant acid reacts with the carbonific;
3. the phosphated carbonific decomposes to form a large volume of foamable carbon and gas, then releases the acid;
4. the resinous material melts to form a film or "skin" over the foamable carbon, and
5. the blowing agents release gases (probably simultaneously with 3, above) which further cause the carbon to foam, while the "skin" assists in retaining the gas in place in the foamed layer, thus forming a thick, highly effective thermal insulation layer.

Ammonium polyphosphate releases a greater quantity of phosphoric acid, when used in a fire-retardant paint coated on a wood surface, and heated, than any other known catalyst. It is therefore a preferred material for use, and is known as an excellent fire-retardant additive for an intumescent coating composition. For example, British Pat. No. 1,171,491 discloses that intumescent coating compositions containing a suitable amount of ammonium polyphosphate achieved a Class A fire rating in the ASTM E-84-50T fire retardant test when applied to a panel of yellow poplar heartwood with a coverage of about 150 ft²/gal. U.S. Pat. No. 3,969,291 also comments upon its use.

Ammonium polyphosphates used as fire-retardant additives in conventional intumescent paint compositions are represented by the general formula:

$$H_{(n-m)+2}(NH_4)_m P_n O_{3n+1}$$

wherein n is an integer having an average value greater than 10, and the maximum value of m is equal to n+2, and m/n has an average value between 0.7 and 1.1. Commercial ammonium polyphosphate is defined as having a water solubility of about 5 grams or less per 100 cc of water, evaluated by slurrying 10 grams of the solids in 100 cc of water for 60 minutes at 25° C.

Although the ammonium polyphosphates represented by the above formula are said to be "substantially water-insoluble", commercial ammonium polyphosphate is soluble in water to some extent since, in actuality, the solubility of the 10 g of ammonium polyphosphate is about 1 to 5 g per 100 cc of water measured in the above-described manner. Hence, a paint composition containing this ammonium polyphosphate may not have sufficient water-resistance, although it may be superior in these regards to a paint composition containing conventional water-soluble ammonium phosphates, such as ammonium dihydrogenphosphate.

However, even the limited solubility it possesses would generally contraindicate its use in treating fabrics, particularly materials such as canvas that is intended to be exposed to the weather.

While there are fire-retardant fabric treating compositions available, they generally are not as effective as is desirable, requiring too long a period for the formulation of a thermal insulating barrier to be practical, and offering too little by way of thermal insulation. In particular, nylon and Dacron polyester fabrics, when treated with prior art flame retardants, are prone to melt and drip, so that a human wearer of such a treated fabric could suffer burns from the material that is intended to be protective.

Historical surveys of treating fabric to impart fire retardance coupled with weather resistance may be found in:

1. Textile World, 93, 90 (1943).
2. Flameproofing Textile Fabrics, Am. Chem. Soc. Monograph 104, Reinhold, N.Y., 1947.
3. The Chemistry and Uses of Fire Retardants, J. W. Lyons, Wiley-Interscience, 1970, pp. 165–240 (For paints, see pp. 256–272).
4. Review of Textile Progess, published annually since 1948; see the sections on "Fireproofing" and "Flameproofing".

BRIEF SUMMARY OF THE INVENTION

The present invention provides novel compositions for application to fabrics formed from natural and synthetic fibers such as, for example: cotton; cotton blends with other fibers, including synthetics such as polyester fibers; nylon; nylon blends; polyester, and polyester blends; and other substrate materials as well, to import semi-durable fire retardant and thermal protective properties.

These compositions are formed by preparing an intumescent composition that is suitable for application to a fabric, specially modified by the addition of a preservative coating composition hereinafter identified as WWFR, capable of importing fire retardant and water repellant properties and conforming to Federal Specification TT-P-595A, Preservative Coating, Canvas, incorporated herein by reference.

More particularly, semi-durable, water repellant, fire resistant fabric coating compositions having intumescent properties prepared in accordance with the present invention contain in admixture a catalyst, a carbonific, a blowing agent (preferably a mixture of a low temperature and a high temperature blowing agent), and WWFR preservative coating, in an aqueous vehicle. The WWFR preservative coating is a viscous, water insoluble, liquid solution that preferably contains, as its important functional ingredients, at least one fire retardant compound, a binder, and a solvent. It may aso contain a water-repellant, pigments, and one or more fungicides. The presence of the WWFR in the fabric coating composition of this invention unexpectedly reduces the time and temperature required to initiate intumescence.

A preferred formulation generally will fall within the following exemplary ranges of preferred ingredients:

| Preferred Component | Preferred Range, % by Weight |
| --- | --- |
| ammonium polyphosphate (preferably the product of Monsanto, sold under the trademark Phos-Chek, decomposing at 325° C. | 5.9–20 |
| tripentaerythritol | 2.6–10 |
| melamine | 2–6 |
| Chlorowax 70 (11.8% composition) | 10–20 |
| WWFR preservative coating | 2–12 |
| water | 32–75.5 |

Suitable WWFR preservative coatings are available commercially under the trademark Canvaseal SE-102 from Everseal Manufacturing Co., Inc., Ridgefield, N.J., and under the trade designation Mildew Resistant Textile Compound from Jarvie Paint Manufacutring Co., Seattle, Washington.

All parts and percentages herein are by weight and all temperatures are on the Fahrenheit scale, unless expressly stated to be otherwise.

Compositions prepared in accordance with the invention are applied to fabric to provide an add-on weight, dry solid basis, of from 40% to 100% by weight based on the fabric weight, to impart the desired thermal protective and fire-retardant properties. Naturally the less applied, the less effective is the treatment, and the more that is applied, the more effective and more expensive. The amount to be applied for a particular purpose will also depend on the nature, weave, and weight of the base fabric and on whether any other treatment is applied to it, so that the amount selected for application is something that can easily be selected by one skilled in the art to suit the particular circumstances existing.

When a fabric is coated with a composition prepared in accordance with the present invention, intumescence should be observed by the formation of a heat insulating foamed layer almost instantaneously upon exposure to even a low energy flame, that is, with a low energy such as 0.14 calories/cm$^2$/sec. Moreover, the treated fabric will exhibit significantly lower energy transfer levels through the protected substrate than is true of substrates treated with currently available, prior art compositions, and fabric treated in accordance with the present invention at an application rate of from about 40% to about 100% of fabric weight will not flame even when exposed to a high energy source such as about 2.7 calories/cm$^2$/sec. Higher application rates than 100% can be employed, but the increase in effectiveness may not be justified.

An especially preferred embodiment of the invention incorporates in the coating composition a small amount of mercury thiocyanate.

DETAILED DESCRIPTION OF THE INVENTION

With fabrics treated with compositions of the present invention, the amount of heat energy necessary to initiate intumescence, and the amount of heat energy that is transferred from the treated fabric material or substrate, is critical to the end item use. A substrate intended for use as clothing for a person such as an astronaut or a soldier, or a fabric material which would serve as padding material in an enclosure for one or more people, as in an airplane, a space capsule, or even a truck or automobile, could not withstand high energy transfer through the substrate material.

The invention deals with the formulation of a semi-durable, fire resistant, water repellent finish to prevent the substrate material from burning and intumesce very rapidly and at a low ignition temperature, and to prevent high energy transfer through the fabric and prevent hazardous burns.

In addition to these advantages, the compositions of the invention are easily formulated in conventional types of equipment, and can be applied with regular machinery in use in th textile trade, without the need for any special operations or special training.

The present invention is based in part on the discovery that the addition of WWFR, a fire resistant, water repellant additive, not only improves weather resistance, as might be expected, but also lowers the temperature and reduces the time at which intumescence occurs and also accelerates the formulation of the foamable carbon layer, once initiated.

Another advantage of the addition of the WWWFR composition is that it imparts sufficient resistance to water and weather that a treated fabric will retain its protective properties over long periods of time, through inclement weather. The WWFR composition contains components which form a film or skin over the bubbling foam which assists in keeping the level of intumescence uniform. These components that make up the WWFR composition are in accordance with the requirements found in Federal Specification TT-P-595A, Preservative Coating, Canvas, dated Apr. 13, 1972. A typical composition is:

| Function | Component | % by Weight |
| --- | --- | --- |
| Water Repellant | aluminum silicate | 10 |
| Fire Retardant | antimony oxide | 10 |
| Binder | chlorinated paraffin (50% chlorinated) | 50 |
| Solvent Vehicle | mineral spirits | 30 |

Other suitable water repellants include: chlorinated paraffin (containing form 40% to 70% chlorine), lead stearate, aluminum acetate and hydrocarbon waxes. Other suitable fire retardants include: zinc borate, antimony pentaoxide, stannic oxide, zinc oxide, and chlorinated paraffins (containing from 40% to 70% chlorine). Other suitable binders include: polyvinyl chloride, polyvinyl chloride-polyvinyl acetate copolymer and chlorinated paraffins (containing from 40% to 70% chlorine). Other suitable solvent vehicles include: toluol, xylol, methyl ethyl ketone and Stoddard solvent.

Combining the WWFR compostiion with the intumescent coating composition develops a finish on the surface of cotton sateen fabric, for example for use as a material for making clothing, that does not readily flake off when the fabric is folded. The conventional intumescent treatment with similar solid add-ons flake or crack from the surface very readily when folded.

Another feature of the invention is the addition of a small amount of a particular inorganic compound, mercury thiocyanate, to the product, with the beneficial and unexpected result that the production of carbonaceous residue is increased out of proportion to the amount added.

The invention will now be further described by several specific examples:

EXAMPLE 1

Representative Composition

The improved intumescent fire resistant composition is formulated by first emulsifying the Chlorowax 70.

| Composition of the Chlorowax 70 Emulsion | |
| --- | --- |
| Component | Parts by Weight |
| Chlorowax 70 | 96.0 |
| Nonionic wetting agent (Hope Superluster, Hope Chemical Co., Pawtucket R.I.) | 28.8 |
| Ammonium Hydroxide | 11.2 |
| Water | 193.6 |
| Stoddard Solvent | 481.6 |
| Total | 811.2 |

The intumescent composition is then prepared.

| Formulation of the Intumescent Composition | | |
| --- | --- | --- |
| Component | Parts by Weight | % by Weight |
| Chlorowax 70 emulsion above | 39.19 | 15.74 |
| Phos Chek P/30 ammonium polyphosphate | 43.65 | 17.53 |
| Tripentaerythritol | 15.69 | 6.30 |
| Ball milled melamine | 11.20 | 4.50 |
| Water | 122.93 | 49.37 |
| WWFR composition of Example 2 | 16.26 | 6.53 |
| Totals | 249.00 | 100.00 |

This formulation, after admixture in the manner described in Example 2, is applied by conventional coating techniques to one side of the fabric. The treated material is then dried at temperatures in the range 222° F. to 260° F.

When applied at a weight in the range from about 40% to about 100% of the basis weight of the fabric, it produces a semi-durable fire resistant/water repellent finish, which will prevent the substrate fabric from burning, and intumesce in three seconds or less at the low ignition energy of a match (0.14 cal/cm$^2$/sec), thereby preventing the substrate from being exposed to the flame.

The further example which follows describes the preparation in greater detail of another composition according to this invention.

EXAMPLE 2

Another Formulation 44 grams of Phos Chek P/30 ammonium polyphosphate, 16 grams tripentaerythritol, and 11 grams of melamine (ball milled) are mixed together. To this mix of powders, 123 grams of water, at room temperature, is added and the mix stirred to form an aqueous slurry.

Separately, 39 grams of the Chlorowax 70 emulsion, above, is weighed and then added to the slurry. Vigorous agitation is required, and a homogenizer mixer is useful. This formulation was based on a ratio of about 5 parts of the aqueous slurry to about 1 part of the Chlorowax 70 emulsion. Vigorous agitation produces a uniform dispersion.

To this dispersion is added 16 grams of WWFR composition to form a dispersed mixture. This dispersed mixture is applied to one side of the 8.2 oz. carded cotton sateen by coating equipment to deposit 81% solids add-on, and then dried at 220° F. to 240° F.

The WWFR composition of this example is the Mildew-Resistant Textile Compound, Jarvie Paint Manufacturing Co., Seattle, Washington, having the following formulation:

| Component | Parts by Weight |
|---|---|
| Mineral spirits | 248 |
| Chlorinated Paraffin (50% Chlorine) | 54 |
| Sulphonated Castor Oil | 5 |
| Water | 5 |
| Non-ionic wetting agent | 13 |
| Titanium dioxide (pigment) | 150 |
| Calcium carbonate (#10 whiting) | 450 |
| Antimony oxide | 50 |
| 2,2' Methylene-Bis (4-Chlorophenol) | 11 |
| Total parts | 986 |

The formula prepared in this way exhibited improved adhesion to the surface of the sateen and was characterized by reducing crocking.

The formulation intumesces and causes the formation of carbonaceous material on horizontal exposure to a flame having a relatively low energy level of about 0.14 cal/cm$^2$/sec in 4 seconds.

EXAMPLE 3

Performance Evaluation, Different Addons

A dispersion mixture was prepared, using the techniques described in Example 2, having the following formulation:

| Component | % by Weight |
|---|---|
| Phos Check P/30 ammonium polyphosphate | 17.53 |
| Tripentaerythritol | 4.94 |
| Melamine | 3.53 |
| Chlorowax 70 Emulsion (above) | 12.33 |
| Water | 56.55 |
| WWFR composition of Example 2 | 5.12 |

This was applied to 9.2 oz. cotton sateen at addons indicated, dried, and the coated fabric was evaluated for flame retardance and heat transfer, with the results tabulated below, in Table 1. Intumescent time is the time span during which intumescence occurs.

Table 1

| % Add-on of Finish to 8.2 oz. Sateen | Heat Flowmeter Time of Exposed Samples | Heat Flowmeter: Heat applied to the treated surface at the rate of 3.4 cal/cm$^2$/sec, & the rate of transfer measured at the opposite surface in cal/cm$^2$/sec | Propane Torch, Horizontal Exposure 3.4Cal/cm$^2$/sec; Time to Intumesce | Propane Torch, Horizontal Exposure 3.4 Cal/cm$^2$/sec; Intumescent Time | Wooden Match Horizontal Exposure 0.14 Cal/cm$^2$/sec; Time to Intumesce |
|---|---|---|---|---|---|
| 98.0% | First 12 sec. | 0.054 | 3 sec. | 11 sec. | 6 sec. |
|  | After 42 sec. | 0.072 |  |  |  |
|  | After 60 sec. | 0.072 |  |  |  |
|  | After 69 sec. | 0.090 |  |  |  |
| 75.0% | First 30 sec. | 0.018 | 4 sec. | 22 sec. | 8 sec. |
|  | After 47 sec. | 0.035 |  |  |  |
|  | After 62 sec. | 0.050 |  |  |  |
|  | After 76 sec. | 0.051 |  |  |  |
| 71.0% | First 2 sec. | 0.088 | immediate | 22 sec. | immediate |
|  | After 40 sec. | 0.051 |  |  |  |
|  | After 66 sec. | 0.088 |  |  |  |
|  | After 84 sec. | 0.053 |  |  |  |

EXAMPLE 4

Incorporation of Mercury Thiocyanate

The formulation of the carbonaceous residue is enhanced by the incorporation into the formulation of mercury thiocyanate. With this product the immediate formulation of additional insulative char or carbonaceous material is effective with a low energy flame and provides a high resistance to a propane torch flame having a high energy level of 3.4 cal/cm$^2$/sec. This high level of insulative char is significant for controlling the rate of substrate temperature rise and therefore offers a promising way to produce effective heat shields from treated fabrics.

The mercury salt is available commercially or it can easily be prepared as follows.

47 grams of red mercuric oxide powder is added to 68.25 grams nitric acid (50 cc). This solution is stirred slowly and allowed to stand till saturated. The solution is then decanted. To the reacted mercury salt 317 grams of ammonium thiocyanate (10% solution) is added, to precipitate the mercury out as mercury thiocyanate. This sample is then filtered and dried.

This product is added to the formula in the following manner:

substrate, which could be next to the skin surface. This reduced energy flow can continue for 90 to 100 seconds. Samples were evaluated and the results reported in Table 2 below.

Table

| % Add-on to to 8.2 oz. Cotton Sateen | Heat Flowmeter Time of Exposed Samples | Heat Flowmeter: Heat applied to the treated surface at the rate of 3.4 cal/cm²/sec, & the rate of transfer measured at the opposite surface in cal/cm²/sec | Propane Torch, Horizontal Exposure 3.4 Cal/cm²/sec; Time to Intumesce | Propane Torch, Horizontal Exposure 3.4 Cal/cm²/sec; Intumescent Time | Wooden Match Horizontal Exposure 0.14 Cal/cm²/sec; Time to Intumescet |
|---|---|---|---|---|---|
| 93.0% | First 46 sec. | 0.051 | 3 sec. | 25 sec. | 6 sec. |
| | After 70 sec. | 0.018 | | | |
| | After 86 sec. | 0.035 | | | |
| | After 90 sec. | 0.018 | | | |
| 81.0% | First 3 sec. | 0.009 | immediately | 20 sec. | 4 sec. |
| | After 20 sec. | 0.036 | | | |
| | After 46 sec. | 0.045 | | | |
| | After 80 sec. | 0.036 | | | |
| | After 94 sec. | 0.036 | | | |
| 110.0% | First 38 sec. | 0.070 | | | |
| | After 64 sec. | 0.035 | | | |
| | After 74 sec. | 0.035 | | | |
| | After 90 sec. | 0.035 | | | |

| Formulation |
|---|
| 9.40 parts Thos Chek P/30 ammonium polyphosphate |
| 3.78 parts tripenaerythritol |
| 2.41 parts melamine (ball milled) |
| 8.44 parts Chlorowax 70 emulsion (above) |
| 26.46 parts water |
| 3.50 parts WWFR composition (above, Example 2) |
| 2.68 parts mercury thiocyanate |
| 56.67 total parts |

This formulation is made up into a dispersion mixture in the following manner:

The Phos Chek P/30, tripentaerythritol, and melamine are mixed together. The Chlorowax 70 emulsion is weighed and placed in a separate container. The water at room temperature is added and the mix stirred at moderate speed. The mix is then placed under a homogenizer mixer and the Chlorowax 70 emulsion added under vigorous agitation to produce a uniform dispersion. The mercury thiocyanate is then added to the mixture.

This dispersed mixture is applied to one side of 8.2 oz. cotton sateen material to be treated and then dried at 220° F. to 240° F.

When a sample treated with the formulation of this example is exposed to an energy source of 3.4 cal/cm²/sec, the carbonaceous residue formed provides a high resistance to heat flow. This quickly formed thick barrier minimizes the heat flow to the untreated side of the

EXAMPLE 5

Further Performance Evalutions

The composition of Example 2 was evaluated for water absorption by a static test. The 8.2 oz. cotton sateen was treated and then tested for its water absorption by the Immersion Method 4502.1 Federal Test Standard Method 191. The treated sample was immersed in water for 1, 2, and 3 hours and the percent absorption determined.

Since only one side of the material was treated with the intumescent finish, the untreated side was sprayed with a fluorocarbon spray.

Following the immersion of the treated samples, they were dried and tested by the high ignition energy of 3.4 cal/cm²/sec from the propane torch. The excellent results, similar to those for Example 2, are shown in Table 3 and indicate no loss of intumescent properties because of the immersion.

Several synthetic and natural materials are treated with the semidurable water repellent and fire resistant intumescent formulation of Example 2 and tested by the Vertical Bunsen for fire resistance, Method 5903 of the Federal Test Standard Method 191, with the results shown in Table 4, heat being applied to the treated surface of the fabric. The same samples were exposed to horizontal flames with the results shown in Tables 5 and 6.

Table 3

Performance of Treated Cloth After Immersion

| Treated Material | % Add-on | Water Absorption % | Heat Flowmeter Time of Exposed Sample | Heat Flowmeter Heat applied to the treated surface at the rate of 3.4 cal/cm²/sec and the rate of transfer measured at the opposite surface in cal/cm²/sec |
|---|---|---|---|---|
| 8.2 oz. cotton sateen | 82% | — | First 10 sec | 0.036 |
| | | | After 40 sec | 0.055 |
| | | | After 80 sec | 0.055 |
| | | | After 95 sec | 0.055 |
| 8.2 oz. cotton sateen immersed 1 hour in water at room temp. | 82% | 33% | First 15 sec | 0.027 |
| | | | After 35 sec | 0.091 |
| | | | After 75 sec | 0.100 |
| | | | After 95 sec | 0.107 |
| 8.2 oz. cotton sateen immersed 2 hours in water at room temp. | 82% | 37% | First 10 sec | 0.036 |
| | | | After 40 sec | 0.100 |
| | | | After 65 sec | 0.109 |
| | | | After 100 sec | 0.100 |

Table 3-continued
Performance of Treated Cloth After Immersion

| Treated Material | % Add-on | Water Absorption % | Heat Flowmeter Time of Exposed Sample | Heat Flowmeter Heat applied to the treated surface at the rate of 3.4 cal/cm²/sec and the rate of transfer measured at the opposite surface in cal/cm²/sec |
|---|---|---|---|---|
| 8.2 oz. cotton sateen immersed 3 hours in water at room temp. | 82% | 45% | First 25 sec | 0.073 |
| | | | After 75 sec | 0.146 |
| | | | After 90 sec | 0.064 |
| | | | After 110 sec | 0.118 |

Table 4
Performance Evaluation of Several Different Fabrics

| Material | % Add-on | After Flame (seconds) | After Glow (seconds) | Char Length* (inches) |
|---|---|---|---|---|
| 8.2 oz. cotton sateen | 91.0 | 0.0 | 0.0 | 2.4 |
| | 91.0 | 0.0 | 0.0 | 2.4 |
| 2.3 oz. nylon | 73.0 | 0.0 | 0.0 | 3.8 |
| | 81.0 | 0.0 | 0.0 | 4.0 |
| 3.0 oz. dacron | 84.0 | 0.0 | 0.0 | 4.9 |
| | 88.0 | 0.0 | 0.0 | 4.7 |
| 5.5 oz. dacron/cotton 50%/50% | 42.0 | 0.0 | 0.0 | 5.4 |
| | 38.0 | 0.0 | 0.0 | 4.1 |
| 9.0 oz. nylon/cotton 50%/50% | 52.0 | 13.0 | 0.0 | 4.5 |
| | 64.0 | 12.0 | 0.0 | 3.3 |
| 3.2 oz. dacron/cotton | 56.0 | 0.0 | 0.0 | 4.6 |
| | 56.0 | 0.0 | 0.0 | 3.9 |
| 3.9 oz. polyurethane foam with nylon tricot | 200.0 | 0.0 | 0.0 | 1.1 |
| | 100.0 | 0.0 | 0.0 | 2.4 |

Table 5
Performance Evaluation

| Sample | % Add-on | Propane Torch Horizontal Exposure 3.4 cal/cm²/sec intumescent Time | Wooden Match Horizontal Exposure 0.14 cal/cm²/sec Time to Intumesce |
|---|---|---|---|
| 8.2 oz cotton sateen | 91.0 | 20 sec. | 8 sec. |
| 2.3 oz nylon | 73.0 | 20 sec. | 4 sec. |
| 5.5 oz cotton/polyester | 38.0 | 10 sec. | 7 sec |
| 9.0 oz nylon/cotton | 64.0 | 20 sec. | 8 sec. |
| 3.2 oz cotton/dacron | 57.0 | 20 sec. | 7 sec. |
| 7.0 oz nylon | 74.0 | 20 sec. | 7 sec. |
| 3.9 oz polyurethane foam/nylon tricot laminate | 100.0 | 20 sec. | 6 sec. |

Table 6
Performance Evaluation
Samples from Some Treated Fabrics as in Table 5

| Sample | Heat Flowmeter Time of Exposed Sample (seconds) | Heat Flowmeter Heat applied to the treated surface at the rate of 3.4 cal/cm²/sec and the rate of transfer measured at the opposite surface in cal/cm²/sec | Propane Torch, Horizontal Exposure 3.4 cal/cm²/sec Time to Intumesce |
|---|---|---|---|
| 8.2 oz cotton sateen | First 18 sec. | 0.055 | 5 sec. |
| | After 30 sec. | 0.091 | |
| | After 70 sec. | 0.082 | |
| | After 84 sec. | 0.091 | |
| 2.3 oz. nylon | First 20 sec. | 0.082 | 4 sec. |
| | After 26 sec. | 0.109 | |
| | After 42 sec. | 0.127 | |
| | After 72 sec. | 0.173 | |
| 5.5 oz cotton/polyester | First 28 sec. | 0.064 | 5 sec. |
| | After 40 sec. | 0.073 | |
| | After 55 sec. | 0.082 | |
| | After 76 sec. | 0.091 | |
| 9.0 oz nylon/cotton | First 8 sec. | 0.045 | 5 sec. |
| | After 26 sec. | 0.036 | |
| | After 62 sec. | 0.045 | |
| | After 83 sec. | 0.045 | |
| 3.2 oz cotton/dacron | First 14 sec. | 0.018 | 4 sec. |
| | After 24 sec. | 0.036 | |
| | After 45 sec. | 0.073 | |
| | After 60 sec. | 0.082 | |
| 7.0 oz. nylon | First 10 sec. | 0.027 | 5 sec. |
| | After 21 sec. | 0.027 | |
| | After 60 sec. | 0.045 | |
| | After 83 sec. | 0.055 | |
| 3.9 oz. polyurethane foam/nylon tricot laminate | First 25 sec. | 0.036 | 3 sec. |
| | After 35 sec. | 0.064 | |
| | After 75 sec. | 0.108 | |
| | After 100 sec. | 0.164 | |

EXAMPLE 6

Further Performance Evaluations 105 grams of Phos Check P/30 ammonium polyphosphate, 37.8 grams of tripenaerythritol, and 27 grams of melamine (ball milled), all powdered materials, are mixed together. To this mix of powders 296 grams of water at room temperature, is added, and the mix is stirred. Separately, 94 grams of the Chlorowax 70 emulsion (above) is weighed and then added to the powder mixture. Vigorous agitation is required. 39 grams of the WWFR compostiion of Example 2, a water insoluble material, is then added, with more vigorous agitation, to form a dispersed mixture. This mixture is applied to one side of 8.2 oz. cotton sateen.

The results (cal/cm$^2$/sec) obtained on this treated sample can be compared to inherently fire resistant treated materials that were exposed to the same high energy from a propane torch of 3.4 cal/cm$^2$/sec., as shown in Table 7 below. The standard Nomex fabric is presently being ued in thermal protective garments. Kevlar and Nomex are registered trademarks for E. I. du Pont de Nemours & Co., Inc., high temperature resistant fibers. Nomex standard fibric is described in Military Specification, Mil-C-83429.

Table 7

Performance Evaluation. Thermal Protection Fabrics

| | Heat Flowmeter Time of Exposed Sample | Heat applied to treated surface at 3.4 cal/cm$^2$/sec. and rate of transfer measured at opposite surface in cal/cm$^2$/sec. |
|---|---|---|
| 5% Kevlar 95% Nomex | 10 sec | .091 |
| | 20 sec | .091 |
| | 30 sec | .091 |
| | 40 sec | .091 |
| | 50 sec | .100 |
| | 60 sec | .109 |
| | 70 sec | .127 |
| | 80 sec | .182 |
| | 90 sec | — |
| | 100 sec | — |
| 50% Kelvar 50% Nomex | 10 sec | .018 |
| | 20 sec | .055 |
| | 30 sec | .064 |
| | 32 sec | .127 |
| | 40 sec | .064 |
| | 50 sec | .073 |
| | 54 sec | .109 |
| | 60 sec | .073 |
| | 70 sec | .109 |
| | 80 sec | .073 |
| | 82 sec | .118 |
| | 90 sec | .091 |
| | 96 sec | .146 |
| Nomex Standard | 10 sec | .000 |
| | 20 sec | .064 |
| | 30 sec | .182 |
| | 40 sec | .100 |
| | 46 sec | .182 |
| | 50 sec | .182 |
| | 56 sec | .182 |
| | 60 sec | .136 |
| Nomex II | 10 sec | .036 |
| | 20 sec | .000 |
| | 30 sec | .009 |
| | 36 sec | .109 |
| | 40 sec | .073 |
| | 50 sec | .164 |
| | 60 sec | .127 |
| | 70 sec | .064 |
| | 80 sec | .073 |
| | 86 sec | .127 |
| | 90 sec | .073 |
| | 100 sec | .073 |
| 8.2 oz cotton sateen | 10 sec | .045 |
| | 20 sec | .018 |
| | 30 sec | .018 |
| | 40 sec | .069 |
| | 50 sec | .037 |
| | 60 sec | .072 |
| | 70 sec | .091 |
| | 80 sec | .050 |

EXAMPLE 7

Formulation Variation

The fllowing components were employed to make up a slightly different formulation than that of Example 1, with a higher content of the WWFR composition described in Example 2.

| Component | Parts by Weight | % by Weight |
|---|---|---|
| Phos Chek P/30 ammonium polyphosphate | 525.9 | 17.53 |
| Tripentaerythritol | 189.0 | 6.30 |
| Melamine | 135.0 | 4.50 |
| Chlorowax 70 emulsion (above) | 474.2 | 15.74 |
| Water | 1,348.8 | 47.49 |
| WWFR composition (a viscous liquid) | 253.2 | 8.44 |

The ammonium polyphosphate, tripentaerythritol and melamine are mixed together. To this mixture is added water at room temperature. This aqueous slurry is thoroughly mixed with a powder mixer. The Chlorowax 70 emulsion is added to the slurry and vigorously agitated with a homogenizer mixer to form an emulation. The WWFR Preservative Coating Material is added to the emulsion, becoming dispersed withinthe emulsion system, creating an oil-in-water system. This emulsion is then applied to one side of an 8.2 oz. cotton sateen fabric with conventional coating equipment to effect a 50% solids add-on and then dried at 220° F. to 240° F.

The treated cloth was then tested by exposing the treated surface to a propane torch, to apply 3.6 cal/cm$^2$/sec. The heat transmitted was measured by a heat flowmeter on the untreated surface, with the results tabulated in Table 8.

Table 8

Evaluation of Heat Transfer

| Time of Exposure | Heat Flowmeter in cal/cm$^2$/sec. |
|---|---|
| Sample #1 | |
| first 20 sec | 0.009 |
| after 30 sec | 0.018 |
| after 50 sec | 0.018 |
| after 90 sec | 0.018 |
| Sample #2 | |
| first 10 sec | 0.050 |
| after 18 sec | 0.065 |
| after 40 sec | 0.065 |
| after 80 sec | 0.040 |

Table 8-continued

Evaluation of Heat Transfer

| Time of Exposure | Heat Flowmeter in cal/cm$^2$/sec. |
|---|---|
| Sample #3 | |
| first 14 sec | 0.141 |
| after 18 sec | 0.211 |
| after 20 sec | 0.229 |
| after 52 sec | 0.211 |
| after 70 sec | 0.180 |

The treated samples did not burn, whether exposed to the torch in a horizontal or in a vertical position.

EXAMPLE 8

Other Formulations

The following formulations have been prepared, evaluated, and found to be satisfactory.

| Component | % by Weight | | | | | | | | | |
|---|---|---|---|---|---|---|---|---|---|---|
| | 8-1 | 8-2 | 8-3 | 8-4 | 8-5 | 8-6 | 8-7 | 8-8 | 8-9 | 8-10 |
| Phos Chek P/30 ammonium polyphosphate | 17.53 | 15.32 | 12.58 | 9.79 | 7.06 | 13.93 | 11.44 | 11.92 | 9.24 | 6.42 |
| Tripentaerythritol | 6.30 | 5.50 | 4.50 | 3.50 | 2.50 | 5.00 | 4.09 | 4.26 | 3.38 | 2.27 |
| Melamine, ball milled | 4.50 | 3.90 | 3.20 | 2.50 | 1.80 | 2.55 | 2.91 | 3.03 | 2.36 | 1.64 |
| Chlorowax 70 Emulsion | 15.70 | 13.80 | 11.30 | 8.80 | 6.30 | 12.54 | 10.27 | 10.71 | 8.31 | 5.73 |
| Water | 49.37 | 55.80 | 63.70 | 71.70 | 79.60 | 50.72 | 57.90 | 60.36 | 67.68 | 72.36 |
| WWFR liquid composition of Example | 6.50 | 5.70 | 4.70 | 3.60 | 2.60 | 5.18 | 4.27 | 4.45 | 3.40 | 2.36 |
| Acrysol ASE* 60 (10%) | — | — | — | — | — | 9.10 | 9.10 | 5.24 | 5.60 | 9.10 |

*Trademark of Rohm and Haas for alkali-soluble acrylic emulsions useful as thickeners for textile-treating compositions.

Formulations 8-1 through 8-5 were evaluated by application to 3.1 oz. cotton broadcloth and 8.2 oz. cotton sateen, at addons of over 65% and over 50% on the two types of cloth, respectively. All performed in a satisfactory manner, including 8-5, which was formulated to a low solids content and applied at addons of 66.7% and 43.5% to the two types of cloth respectively.

Formulations 8-6 through 8-10 included an acrylic emulsion, Acrysol ASE 60, at 10% solids, containing a film-forming polyacrylate salt.

The formulations were applied to the two types of cloth, 8.2 oz. cotton sateen and 9 oz. dacron/cotton, 50%/50%, at addons at or above 50% and 38% respectively, with satisfactory performance.

CONCLUSION

In the foregoing examples, the components selected for use are preferred components, employed in compositional environments that are familiar. However, they are illustrative, and other materials can be used with satisfactory results.

Ammonium polyphosphate is the preferred source of phosphoric acid. However, amide polyphosphates, such as those disclosed in U.S. Pat. No. 3,969,291, which is incorporated herein by reference, could also be used, with proper formulation adjustments for ease of application and the like.

The blowing agents used were also preferred materials, melamine, which decomposes at 250° C., and Chlorowax 70 chlorinated paraffin, which decomposes at 190° C. (at least one source reports that it decomposes slowly at 135° C.; Zimmerman and Levine, Handbook of Material Trade Names, 3rd Ed. p. 131). Other useful blowing agents include dicyandiamide (d. about 210° C.), guanidine (d. 160° C.), clycine (d. about 233° C.), and urea (d. about 130° C.).

Similarly, while tripentaerythritol is a preferred carbonific, many other suitable materials may be used instead, including the following exemplary items: sugars: glucose, maltose, and arabinose; polyhydric alcohols: erythritol, penterythritol and its dimer arabitol, sorbitol, and inositol; polyphdric phenols, such as resorcinol; and starches. In general, carbonific materials having a high carbon content and a high hydroxy group content are preferred.

Generally, the amount of carbonific material in the dispersion mixture as it is applied, dry solids basis (dsb), is in the range from 2% to 50% by weight based on total solids; the amount of phosphoric acid precursor is from 5% to 90% by weight, dsb, based on total solids, and preferably from 10% to 80%; and the amount of total blowing agent present is from about 2% to about 50% by weight, dsb, based on total solids.

The amount of WWFR composition employed can be expressly simply based on Phos Chek P/30 ammonium polyphosphate (or its equivalent in terms of supply of acid), the ratio being 1 part by weight of WWFR composition (dsb for each 5 to 20 parts of the polyphosphate).

The WWFR composition preferably contains a binder material in sufficient quantity to contribute at least 2%, and preferably at least 4% of all solids present in the dispersion mixture. The WWFR composition also includes one or more water repellant materials, such as wax or silicone resin. It may also contain Chlorowax 40 chlorinated paraffin, Chlorowax 70 chlorinated paraffin, or the like, as a fire retardant, with or without adjuvants such as antimony trioxide and the like.

Finishes applied in accordance with the present invention offer several advantages. Two significant features are the protection from dripping of the melt formed from nylon and dacron fabrics when exposed to a flame. The intumescent properties hold the melt and prevent dripping from both of these fabrics.

The potentials are numerous for such a finish; it can be further protected from crocking by fusing Pellon, a non-woven blend of 50% nylon and 50% polyester, 3.0 oz/sq. yd., to the treated material. The surface of the fused Pellon fabric could be sprayed with a borax-boric acid mixture (7:3 ratio). This fire retardant treatment would have some afterglow properties when exposed to a flame. This would be beneficial, since a temporary afterglow would enhance the properties of intumescence since the glow would serve to promote formulation of the insulated barrier.

Generally every coating must be formulated with care, to optimize intumescence and coating properties as well, with due attention to the properties of the coated fabric as to appearance, hand, resistance to weathering, stiffness, strength, resistance to bleach, and so on.

While the present invention is useful for fabrics for use in draperies, mattress batting and ticking, garments, and for interior fabrics where weathering is unlikely although laundering may occur, it is also intended for use for outdoor fabrics, particularly for military applications.

In the formulation of the intumescent fire-retardant coating composition a high speed rotating dissolver, pebble mill and the like can be suitable used. If desired, various additives can be incorporated into the composition during the formulation such as inorganic fibers, binders, dyes, wetting agents, dispersing agents, antifoaming agents, pigments, fungicides or bactericides and the like in minor amounts.

What is claimed is:

1. A process for imparting an intumescent, water repellent, fire retardant finish to fabrics, which comprises applying to the fabric an aqueous dispersion of:
    a. 5.9–20 percent by weight of a substantially water insoluble ammonium polyphosphate catalyst,
    b. 2.6–10 percent by weight of a carbonific,
    c. 2–6 percent by weight of a blowing agent selected from the group consisting of dicyanidiamide, urea, melamine or guanidine,
    d. 10–20 percent by weight of an emulsion containing a chlorinated paraffin, a lower temperature blowing agent,
    e. 2–12 percent by weight of viscous, water insoluble liquid solution containing 10 percent by weight of a water repellent selected from the group consisting of lead stearate, aluminum acetate, aluminum silicate and hydrocarbon waxes, 10 percent by weight of a fire-retardant selected from the group consisting of zinc borate, antimony oxide, stannic oxide and zinc oxide, 50 percent by weight of a binder, and 30 percent by weight of a solvent vehicle, and
    f. 32–75.5 percent by weight of water; and then drying said dispersion on said fabric.

2. A process in accordance with claim 1 wherein at least 40 percent by weight and up to 100 percent by weight of the fabric, dry solids basis, of the composition is applied to the fabric.

3. A process in accordance with claim 2 wherein said emulsion containing chlorinated paraffin contains 11.8 percent by weight of a chlorinated paraffin, a solvent for said paraffin and water.

4. A process in accordance with claim 3 wherein said carbonific is tripentaerythritol, said blowing agent is melamine, and said chlorinated paraffin has a chlorine content of about 70 percent by weight.

5. A process in accordance with claim 4 wherein said water repellent is aluminum silicate, said fire retardant is antimony oxide, and said binder is chlorinated paraffin containing from 40% to 70% chlorine.

6. A process in accordance with claim 5 wherein said aqueous dispersion further contains mercury thiocyanate.

7. A product produced by the process of claim 1.

8. A product produced by the process of claim 5.

* * * * *